US012769960B2

(12) United States Patent
Li et al.

(10) Patent No.: US 12,769,960 B2
(45) Date of Patent: Oct. 20, 2026

(54) METHOD AND APPARATUS FOR IDENTITY AUTHENTICATION, STORAGE MEDIUM, AND ELECTRONIC DEVICE

(71) Applicant: ANT ZHIXIN (HANGZHOU) INFORMATION TECHNOLOGY CO., LTD., Hangzhou (CN)

(72) Inventors: Junkui Li, Hangzhou (CN); Weiqiang Wang, Hangzhou (CN); Zhenya Wang, Hangzhou (CN); Lingyun Mi, Hangzhou (CN)

(73) Assignee: ANT ZHIXIN (HANGZHOU) INFORMATION TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 19/399,391

(22) Filed: Nov. 24, 2025

(65) Prior Publication Data

US 2026/0148022 A1 May 28, 2026

(30) Foreign Application Priority Data

Nov. 26, 2024 (CN) ......................... 202411707432.6

(51) Int. Cl.
*G06K 7/10* (2006.01)
*G06K 7/14* (2006.01)

(52) U.S. Cl.
CPC ....... *G06K 7/10297* (2013.01); *G06K 7/1413* (2013.01); *G06K 7/1417* (2013.01)

(58) Field of Classification Search
CPC ............. G06K 7/10297; G06K 7/1413; G06K 7/1417; G06K 7/0893; G06K 7/088; G06Q 20/00
(Continued)

(56) References Cited

U.S. PATENT DOCUMENTS 12,155,405 B2 * 11/2024 Kunlin ................. H04B 1/1615
12,437,047 B1 * 10/2025 Doan ................. A61N 1/37282
(Continued)

FOREIGN PATENT DOCUMENTS

CN 102016891 A 4/2011
CN 108462674 A1 8/2018
(Continued)

OTHER PUBLICATIONS

"Second Office Action" regarding Application No. 202411707432.6, published on Jan. 18, 2025, pp. 1-13.
(Continued)

*Primary Examiner* — Edwyn Labaze

(57) ABSTRACT

Embodiments of this specification disclose a method and an apparatus for identity authentication, a storage medium, and an electronic device. User identity information input by a target user is obtained and sent to a first network device, so that the first network device generates authentication token information corresponding to the target user, where the first user equipment does not support NFC; the authentication token information returned by the first network device is received, so that second user equipment performs NFC authentication on a target document of the target user based on the authentication token information; and an authentication result query request is sent to the first network device, so that the first network device obtains authentication result information, and determines, whether identity authentication of the target user is successful.

12 Claims, 6 Drawing Sheets

(58) Field of Classification Search
USPC ................ 235/380, 379, 375, 382, 487, 492
See application file for complete search history.

(56) References Cited

U.S. PATENT DOCUMENTS

| | | | | |
|---|---|---|---|---|
| 2014/0162598 | A1 | 6/2014 | Villa-Real | |
| 2015/0161591 | A1* | 6/2015 | Yang .................... | G06Q 20/326 235/379 |
| 2016/0012465 | A1 | 1/2016 | Sharp | |
| 2016/0087957 | A1* | 3/2016 | Shah ..................... | H04L 63/205 726/1 |
| 2018/0013782 | A1* | 1/2018 | Choyi ................. | H04L 63/1433 |

FOREIGN PATENT DOCUMENTS

| | | | |
|---|---|---|---|
| CN | 109413086 | A | 3/2019 |
| CN | 111563243 | A | 8/2020 |
| CN | 211554950 | U | 9/2020 |
| CN | 212649500 | U | 3/2021 |
| CN | 113596788 | A1 | 11/2021 |
| CN | 113656761 | A | 11/2021 |
| CN | 115481705 | A | 12/2022 |
| CN | 116033419 | A | 4/2023 |
| WO | 2023022584 | A1 | 2/2023 |

OTHER PUBLICATIONS

"First Office Action" regarding Application No. 202411707432.6, published on Jan. 5, 2025, pp. 1-6.

Gonzales et al.: "Hybrid Two-Stage Architecture for Tampering Detection of Chipless ID Cards," IEEE Transactions on Biometrics, Behavior, and Identity Science, vol. 3, No. 1, Jan. 2021. Shaanxi Normal University. Downloaded on Mar. 5, 2026 at 02:37:33 UTC from IEEE Xplore. pp. 1-12.

Xie, Chao: "Research and Prototype Implementation of Authentication Service System Based on eID." Beijing University of Posts and Telecommunications, Dec. 30, 2017. pp. 1-80.

"Notification of Patent Registration" regarding Application No. 202411707432.6, mailed on Feb. 27, 2025, pp. 1-4.

"European Search Report" regarding Application No. 25217396.8, mailed on Jan. 2, 2026, pp. 1-10.

Schwarz et al. @Cispa De Et 1-13 H04W12/06 Al: "FelDo Recoverable FIDO2 Tokens Using H04W12/122 Electronic IDs", H04W12/47 Proceedings of The 2022 ACM SIGSAC Conference on Computer and Communications Security, ACMPUB27, New York, NY, USA, Nov. 7, 2022 (Nov. 7, 2022), pp. 2581-2594, XP058952824, DOI: 10.1145/3548606.3560584 ISBN: 978-1-4503-9466-6.

* cited by examiner

METHOD AND APPARATUS FOR IDENTITY AUTHENTICATION, STORAGE MEDIUM, AND ELECTRONIC DEVICE

TECHNICAL FIELD

The present invention relates to computer technologies, and in particular, to a method and an apparatus for identity authentication, a storage medium, and an electronic device.

BACKGROUND

With the rapid development of generative AI technologies, attack methods against face identity authentication are proliferating, accompanied by a growing number of successful attempts. In a process of electronic KYC (eKYC, electronic Know Your Customer, where eKYC is a method for verifying a customer identity in an electronic manner), real person identity authentication is required in many scenarios.

Real person identity authentication is to verify a real identity of a person by using various technical means, to ensure that an object on which identity authentication is currently performed is indeed a specific and real person, not just a virtual entity or an impostor having the identity information. Real person identity authentication emphasizes verification of a "real person", and is usually used in a scenario with a high security requirement, such as real name authentication for financial services, digital government, and social media. If real person identity authentication is performed by relying on only a face identity authentication technology, reliability of identity authentication may not be ensured in the face of an attack. Therefore, another identity authentication manner needs to be introduced to improve security.

An NFC (Near Field Communication, near field communication) technology may be used to read information from a document such as an identity card, and compare and authenticate the data with an authoritative database. However, currently, not all mobile phones support an NFC function

SUMMARY

An objective of embodiments of this specification is to provide a method and an apparatus for identity authentication, a storage medium, and an electronic device.

An embodiment of this specification provides a method for identity authentication, applied to first user equipment, and proposes a solution for cross-device NFC-assisted authentication. After completing biometric authentication, a user further needs to perform NFC document verification. When a mobile phone of the user does not support an NFC function, a device that supports the NFC function may assist in completing authentication, thereby implementing integrity and security of NFC authentication. This method effectively prevents an injection attack based on generative AI, and enables the device that does not support the NFC function to complete NFC real person document authentication, thereby successfully completing an identity authentication procedure. This method effectively prevents a risk of imposture caused by the injection attack of generative AI, and ensures accuracy and security of identity authentication. In an assisted authentication process, identity information such as an identity card name of a person to be authenticated is stored in a backend server and is represented by using a token, and only the token is transmitted to an assisted authentication party. The assisted authentication party cannot directly obtain specific identity information of the person to be authenticated, thereby effectively protecting privacy of the person to be authenticated. Even if the token is leaked in the authentication or transmission process, user information may not be leaked, thereby ensuring information security. The method includes:

- obtaining user identity information input by a target user, and sending the user identity information to a first network device, so that the first network device generates authentication token information corresponding to the target user, where the first user equipment does not support NFC, and the target user has completed biometric authentication on the first user equipment;
- receiving the authentication token information returned by the first network device, so that second user equipment performs NFC authentication on a target document of the target user based on the authentication token information provided by the first user equipment; and
- sending an authentication result query request corresponding to the authentication token information to the first network device, so that the first network device obtains authentication result information that corresponds to the target document and that is determined based on the authentication token information, and determines, based on the authentication result information, whether identity authentication of the target user is successful.

Further, obtaining user identity information input by a target user includes:

- determining whether the first user equipment supports NFC; and
- if the first user equipment does not support NFC, obtaining the user identity information input by the target user.

Further, the method further includes:

- sending, in response to a sending trigger operation performed by the target user for the authentication token information, the authentication token information to the second user equipment.

Further, the method further includes:

- generating and presenting graphic code information corresponding to the authentication token information, so that the second user equipment obtains the authentication token information by scanning the graphic code information.

An embodiment of this specification provides a method for identity authentication, applied to a first network device. The method includes:

- receiving user identity information of a target user sent by first user equipment, and generating authentication token information corresponding to the target user, where the target user has completed biometric authentication on the first user equipment, and the first user equipment does not support NFC;
- returning the authentication token information to the first user equipment, so that second user equipment performs NFC authentication on a target document of the target user based on the authentication token information provided by the first user equipment; and
- obtaining authentication result information that corresponds to the target document and that is determined based on the authentication token information, and determining, based on the authentication result information, whether identity authentication of the target user is successful.

An embodiment of this specification provides a method for identity authentication, applied to second user equipment. The method includes:

performing, based on authentication token information that corresponds to a target user and that is provided by first user equipment, NFC reading on a target document of the target user, to obtain NFC information corresponding to the target document, where the target user has completed biometric authentication on the first user equipment, and the first user equipment does not support NFC; and sending the NFC information and the authentication token information to a second network device, so that the second network device obtains user identity information of the target user based on the authentication token information, performs authentication based on the NFC information and the user identity information, and if the authentication is successful, updates status information corresponding to the authentication token information, and in response to receiving an authentication result query request sent by a first network device for the authentication token information, determines, based on an authentication status, authentication result information corresponding to the target document, and returns the authentication result information to the first network device, so that the first network device determines, based on the authentication result information, whether identity authentication of the target user is successful.

Further, the method further includes:

receiving the authentication token information sent by the first user equipment.

Further, the method further includes:

obtaining the authentication token information in response to a scanning operation performed on graphic code information corresponding to the authentication token information, where the graphic code information is generated on the first user equipment.

An embodiment of this specification provides a method for identity authentication, applied to a second network device. The method includes:

receiving NFC information that corresponds to a target document of a target user and that is sent by second user equipment and authentication token information corresponding to the target document, where the target user has completed biometric authentication on first user equipment, the first user equipment does not support NFC, and the second user equipment performs NFC reading on the target document based on the authentication token information provided by the first user equipment, to obtain the NFC information;

obtaining user identity information of the target user based on the authentication token information, performing authentication based on the NFC information and the user identity information, and updating status information corresponding to the authentication token information if the authentication is successful; and receiving an authentication result query request sent by a first network device for the authentication token information, determining, based on an authentication status, authentication result information corresponding to the target document, and returning the authentication result information to the first network device, so that the first network device determines, based on the authentication result information, whether identity authentication of the target user is successful.

Further, performing authentication based on the NFC information and the user identity information includes:

performing information comparison verification and signature verification based on the NFC information and the user identity information.

An embodiment of this specification further provides a first apparatus for identity authentication, including:

a document information input module, configured to: obtain user identity information input by a target user, and send the user identity information to a first network device, so that the first network device generates authentication token information corresponding to the target user, where the first user equipment does not support NFC, and the target user has completed biometric authentication on the first user equipment;

a first receiving module, configured to receive the authentication token information returned by the first network device, so that second user equipment performs NFC authentication on a target document of the target user based on the authentication token information provided by the first user equipment; and an authentication result query module, configured to send an authentication result query request corresponding to the authentication token information to the first network device, so that the first network device obtains authentication result information that corresponds to the target document and that is determined based on the authentication token information, and determines, based on the authentication result information, whether identity authentication of the target user is successful.

An embodiment of this specification further provides a second apparatus for identity authentication, including:

an authentication token generation module, configured to: receive user identity information of a target user sent by first user equipment, and generate authentication token information corresponding to the target user, where the target user has completed biometric authentication on the first user equipment, and the first user equipment does not support NFC;

a first sending module, configured to return the authentication token information to the first user equipment, so that second user equipment performs NFC authentication on a target document of the target user based on the authentication token information provided by the first user equipment; and an authentication result obtaining module, configured to: obtain authentication result information that corresponds to the target document and that is determined based on the authentication token information, and determine, based on the authentication result information, whether identity authentication of the target user is successful.

An embodiment of this specification further provides a third apparatus for identity authentication, including:

an NFC authentication module, configured to perform, based on authentication token information that corresponds to a target user and that is provided by first user equipment, NFC reading on a target document of the target user, to obtain NFC information corresponding to the target document, where the target user has completed biometric authentication on the first user equipment, and the first user equipment does not support NFC; and a second sending module, configured to send the NFC information and the authentication token information to a second network device, so that the second network device obtains user identity information of the target user based on the authentication token information, performs authentication based on the NFC information and the user identity information, and if the authentication is successful, updates status information corresponding to the authentication token information, and in response to receiving an authentication result query request sent by a first network device for the authentication token information, determines, based on an authentication status, authentication result information corresponding to the target document, and returns the authentication result information to the first network device, so that the first network device determines, based on the authentication result information, whether identity authentication of the target user is successful.

An embodiment of this specification further provides a fourth apparatus for identity authentication, including:

a second receiving module, configured to receive NFC information that corresponds to a target document of a target user and that is sent by second user equipment and authentication token information corresponding to the target document, where the target user has completed biometric authentication on first user equipment, the first user equipment does not support NFC, and the second user equipment performs NFC reading on the target document based on the authentication token information provided by the first user equipment, to obtain the NFC information;

an authentication module, configured to: obtain user identity information of the target user based on the authentication token information, perform authentication based on the NFC information and the user identity information, and update status information corresponding to the authentication token information if the authentication is successful; and an authentication result determining module, configured to: receive an authentication result query request sent by a first network device for the authentication token information, determine, based on an authentication status, authentication result information corresponding to the target document, and return the authentication result information to the first network device, so that the first network device determines, based on the authentication result information, whether identity authentication of the target user is successful.

An embodiment of this specification further provides a storage medium, the storage medium stores a computer program, and the computer program is suitable for being loaded by a processor to perform the steps of the foregoing method.

An embodiment of this specification further provides an electronic device, including a processor and a memory, where the memory stores a computer program, and the computer program is suitable for being loaded by the processor to perform the steps of the foregoing method.

In the embodiments of this specification, a solution for cross-device NFC-assisted authentication is proposed. After completing biometric authentication, a user further needs to perform NFC document verification. When a mobile phone of the user does not support an NFC function, a device that supports the NFC function may assist in completing authentication, thereby implementing integrity and security of NFC authentication. This method effectively prevents an injection attack based on generative AI, and enables the device that does not support the NFC function to complete NFC real person document authentication, thereby successfully completing an identity authentication procedure. This method effectively prevents a risk of imposture caused by the injection attack of generative AI, and ensures accuracy and security of identity authentication. In an assisted authentication process, identity information such as an identity card name of a person to be authenticated is stored in a backend server and is represented by using a token, and only the token is transmitted to an assisted authentication party. The assisted authentication party cannot directly obtain specific identity information of the person to be authenticated, thereby effectively protecting privacy of the person to be authenticated. Even if the token is leaked in the authentication or transmission process, user information may not be leaked, thereby ensuring information security.

DETAILED DESCRIPTION

Figure 1:
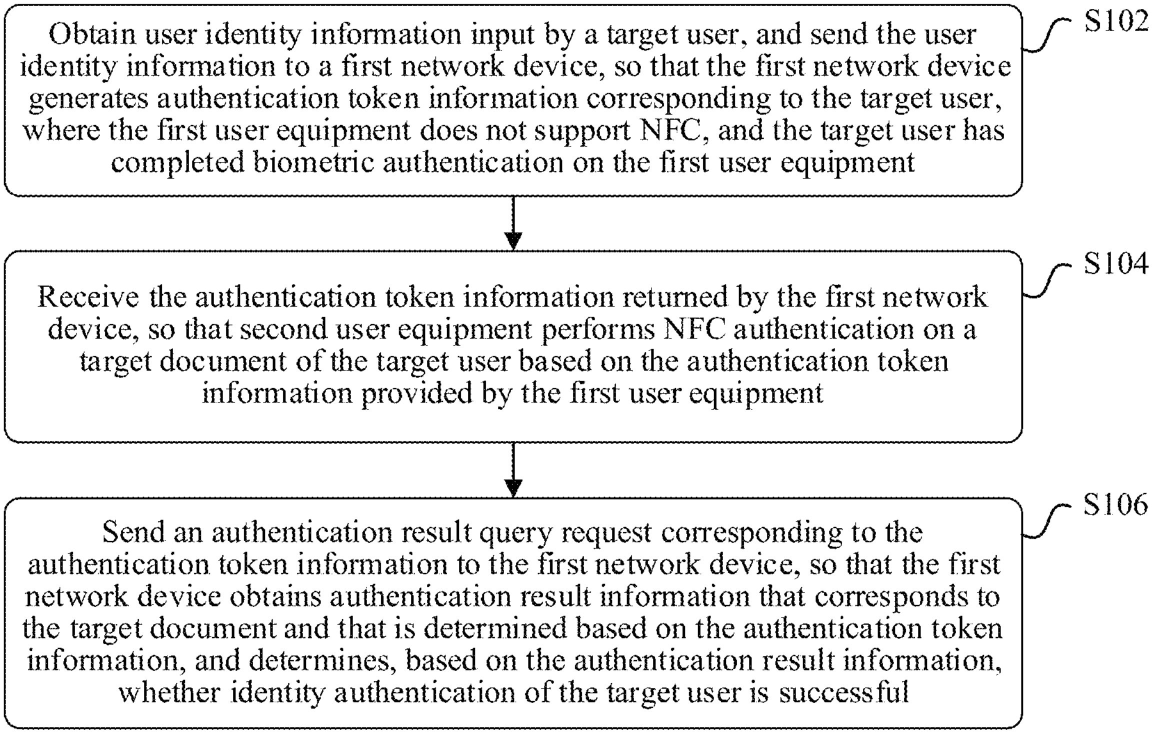
FIG. 1 is a schematic flowchart of a method for identity authentication according to an embodiment of this specification.

To make the objectives, technical solutions, and advantages of this specification clearer, the following clearly and completely describes the technical solutions of this specification with reference to specific embodiments of this specification and corresponding accompanying drawings. Apparently, the described embodiments are only a part rather than all of the embodiments of this specification. All other embodiments obtained by a person of ordinary skill in the art based on the embodiments of this specification without creative efforts shall fall within the protection scope of this specification.

The device referred to in this application includes, but is not limited to, user equipment, a network device, or a device formed by integrating user equipment and a network device through a network. The user equipment includes, but is not limited to, any mobile electronic product, such as a smartphone or a tablet computer, that can perform human-computer interaction with a user (for example, perform human-computer interaction by using a touchpad). The mobile electronic product may use any operating system, such as an Android operating system or an iOS operating system. The network device includes an electronic device that can automatically perform value calculation and information processing based on a preset or stored instruction. Hardware of the electronic device includes, but is not limited to, a microprocessor, an application specific integrated circuit (Application Specific Integrated Circuit, ASIC), a programmable logic device (Programmable Logic Device, PLD), a field programmable gate array (Field Programmable Gate Array, FPGA), a digital signal processor (Digital Signal Processor, DSP), an embedded device, and the like. The network device includes, but is not limited to, a computer, a network host, a single network server, a plurality of network server sets, or a cloud including a plurality of servers. Herein, the cloud includes a large quantity of computers or network servers based on cloud computing (Cloud Computing). The cloud computing is a type of distributed computing, and is a virtual supercomputer including a cluster of loosely coupled computers. The network includes, but is not limited to, the Internet, a wide area network, a metropolitan area network, a local area network, a VPN network, a wireless Ad Hoc network (Ad Hoc network), and the like. Preferably, the device may further be a program running on a device formed by integrating the user equipment, the network device, or the user equipment and the network device, the network device, a touch terminal, or the network device and the touch terminal by using a network. Terms such as first and second mentioned in this application are used for indicating a name, and do not indicate any particular sequence. Certainly, a person skilled in the art should understand that the foregoing devices are merely examples, and other existing or future possible devices, if applicable to this application, shall also fall within the protection scope of this application, which is incorporated herein by reference.

FIG. 1 is a schematic flowchart of a method for identity authentication that is applied to first user equipment according to an embodiment of this specification. In this embodiment of this specification, the method for identity authentication is applied to a first apparatus for identity authentication or an electronic device configured with the first apparatus. The following describes the procedure shown in FIG. 1 in detail. The method for identity authentication may specifically include the following steps.

S102: Obtain user identity information input by a target user, and send the user identity information to a first network device, so that the first network device generates authentication token information corresponding to the target user, where the first user equipment does not support NFC, and the target user has completed biometric authentication on the first user equipment.

In some embodiments, the target user has completed biometric authentication on the first user equipment. The biometric authentication refers to performing identity authentication based on feature information of at least one part of a human body, and includes, but is not limited to, human face authentication, fingerprint authentication, and the like. It should be noted that the foregoing authentication manners are merely examples rather than limitations. A person skilled in the art should understand that any manner of biometric authentication may fall within the protection scope of this specification.

In some embodiments, the first user equipment does not support NFC. In response to a case in which the target user initiates an authentication request for an authentic document on the first user equipment (where the authentication request is used for verifying whether a user corresponding to the authentic document subsequently provided by the target user is the target user), a collection page of user identity information of the target user is rendered on the first user equipment, the target user inputs user identity information on the first user equipment, and the first user equipment may send the user identity information input by the target user to a corresponding first network device. A target document is an authentic document possessed by the target user, and the target document includes, but is not limited to, an identity card, a passport, a vehicle license, a driving license, and the like. It should be noted that the foregoing document types are merely examples rather than limitations. A person skilled in the art should understand that any type of target document may be included in the protection scope of this specification. The user identity information includes, but is not limited to, a user name, a document number of at least one authentic document possessed by the user, and the like. Specific content of the user identity information is not limited in this specification.

In some embodiments, in response to a case in which the target user initiates an authentication request for an authentic document on the first user equipment, the first user equipment may send a corresponding online account opening request to a corresponding first network device. The first network device opens an account for the target user based on the received online account opening request, and returns a collection request for user identity information of the target user to the first user equipment. The first user equipment renders a corresponding collection page based on the received collection request for the target user to input the user identity information.

In some embodiments, if the first network device and a second network device are a same network device, after receiving the user identity information, the first network device stores the user identity information, and randomly generates a piece of authentication token information (token, for example, a character string). The authentication token information is unique for different users and different types of documents. For example, different users correspond to different authentication token information, and different types of documents of a same user also correspond to different authentication token information. In some embodiments, an association relationship between the authentication token information and the target user may be established in the first network device, and the user identity information of the target user may be obtained in the first network device by using the authentication token information.

In some embodiments, if the first network device and the second network device are two different network devices, after receiving the user identity information, the first network device may send a corresponding authentication token information obtaining request to the second network device, where the authentication token information obtaining request includes the user identity information. After receiving the authentication token information obtaining request, the second network device stores the user identity information, randomly generates a piece of authentication token information (token, for example, a character string), and establishes an association relationship between the authentication token information and the target user in the second network device. The user identity information of the target user may be obtained in the second network device by using the authentication token information. In some embodiments, the second network device may return the generated authentication token information to the first network device.

In some embodiments, the second network device (that is, an NFC authentication network device) is a network device corresponding to user equipment, that is, second user equipment (that is, NFC authentication user equipment) that supports NFC other than the first user equipment. A user (that is, an NFC-assisted authentication user) corresponding to the second user equipment may also be the target user, or the user corresponding to the second user equipment is a user other than the target user. In some embodiments, the first network device and the second network device may be a same network device, or may be two different network devices.

S104: Receive the authentication token information returned by the first network device, so that the second user equipment performs NFC authentication on the target document of the target user based on the authentication token information provided by the first user equipment.

In some embodiments, the first network device may return the authentication token information corresponding to the target user to the first user equipment. After receiving the authentication token information, the first user equipment may directly present the authentication token information to the target user, or may first generate graphic code information corresponding to the authentication token information, and then present the graphic code information to the target user. The graphic code information includes, but is not limited to, a QR code, a bar code, and the like. This is not limited in this specification.

In some embodiments, the target user may send the authentication token information or the graphic code information to the second user equipment by using the first user equipment. For example, the target user sends the authentication token information or the graphic code information to the second user equipment by using a social networking application on the first user equipment. In some embodiments, the authentication token information may alternatively be manually input into the second user equipment by the user (that is, the NFC-assisted authentication user) corresponding to the second user equipment.

In some embodiments, the second user equipment may obtain the authentication token information based on a scanning operation, performed by the user corresponding to the second user equipment by using a camera on the second user equipment, on the graphic code information presented on the first user equipment. In some embodiments, the second user equipment may obtain the authentication token information based on a scanning operation, performed by the user corresponding to the second user equipment by using a camera on the second user equipment, on graphic code information sent by the first user equipment to the second user equipment. In some embodiments, the second network device (that is, an NFC authentication network device) is a network device corresponding to user equipment, that is, second user equipment (that is, NFC authentication user equipment) that supports NFC other than the first user equipment. A user (that is, an NFC-assisted authentication user) corresponding to the second user equipment may also be the target user, or the user (that is, the NFC-assisted authentication user) corresponding to the second user equipment is a user other than the target user. In some embodiments, the first network device and the second network device may be a same network device, or may be two different network devices.

In some embodiments, after the second user equipment obtains the authentication token information provided by the first user equipment, the user corresponding to the second user equipment, that is, the NFC-assisted authentication user, may perform, based on the authentication token information, assisted authentication on at least one authentic document (that is, the target document) possessed by the target user. For example, the second user equipment initiates a corresponding assisted authentication request to the NFC-assisted authentication user, and the NFC-assisted authentication user processes assisted authentication corresponding to the authentication token information. In some embodiments, the second user equipment may pull up an NFC page, reads, by using an NFC module in the second user equipment, at least one authentic document (that is, the target document) that is possessed by the target user and that is provided by the NFC-assisted authentication user, to obtain corresponding NFC information (that is, information read by the NFC module for the authentic target document), and then the second user equipment may send the NFC information and the authentication token information to a corresponding second network device.

In some embodiments, the second network device obtains, based on the received authentication token information, the user identity information (that is, the user identity information input by the target user on the first user equipment) of the target user associated with the authentication token information, then performs information comparison based on the user identity information and the NFC information, to determine, based on a comparison result, an authentication result corresponding to the target document. The authentication result indicates whether NFC authentication performed on the target document (that is, verify whether the target document is an authentic document of the target user) is successful. In some embodiments, an association relationship between the authentication token information and the authentication result may further be established on the second network device. In some embodiments, the second network device may return the authentication result to the second user equipment, and present the authentication result to the NFC-assisted authentication user on the second user equipment. In some embodiments, if the NFC-assisted authentication user and the target user are a same user, the target user may directly view the authentication result. If the NFC-assisted authentication user and the target user are two different users, the NFC-assisted authentication user may show the authentication result presented on the second user equipment to the target user. Alternatively, the NFC-assisted authentication user may perform a sending operation on the authentication result, so that the second user equipment sends the authentication result to the first user equipment, and presents the authentication result to the target user on the first user equipment. For example, the NFC-assisted authentication user sends the authentication result to the first user equipment by using a social networking application.

S106: Send an authentication result query request corresponding to the authentication token information to the first network device, so that the first network device obtains authentication result information that corresponds to the target document and that is determined based on the authentication token information, and determines, based on the authentication result information, whether identity authentication of the target user is successful.

In some embodiments, in response to a case in which the target user continues the identity authentication procedure, the first user may send the authentication result query request corresponding to the authentication token information to the first network device. The authentication result query request is used for querying an authentication result corresponding to the target document of the target user associated with the authentication token information, that is, querying whether NFC authentication performed on the target document of the target user associated with the authentication token information is successful. The authentication result query request includes the authentication token information.

In some embodiments, if the first network device and the second network device are a same network device, after receiving the authentication result query request, the first network device may query, based on the authentication token information, for an authentication result corresponding to the target document of the target user associated with the authentication token information. The authentication result indicates whether NFC authentication performed on the target document (that is, verify whether the target document is an authentic document of the target user) is successful.

In some embodiments, if the first network device and the second network device are two different network devices, after receiving the authentication result query request, the first network device may send the authentication result query request to the second network device, and the second network device queries, based on the authentication token information, for an authentication result corresponding to the target document associated with the authentication token information, and returns the authentication result to the first network device.

In some embodiments, the first network device determines, based on the obtained authentication result corresponding to the target document, whether identity authentication of the target user is successful, and if the authentication result of NFC authentication performed on the target document is that the authentication is successful, determines that identity authentication of the target user is successful, or if the authentication result of NFC authentication performed on the target document is that the authentication fails, determines that identity authentication of the target user fails. In some embodiments, the first network device may return indication information indicating whether identity authentication of the target user is successful to the first user equipment, so that the indication information is presented to the target user on the first user equipment. Through the foregoing steps, NFC authentication on an authentic document is completed on a device that does not support NFC through cooperation of a device that supports NFC, thereby ensuring security and integrity of identity authentication.

In this embodiment of this specification, a solution for cross-device NFC-assisted authentication is proposed. After completing biometric authentication, a user further needs to perform NFC document verification. When a mobile phone of the user does not support an NFC function, a device that supports the NFC function may assist in completing authentication, thereby implementing integrity and security of NFC authentication. This method effectively prevents an injection attack based on generative AI, and enables the device that does not support the NFC function to complete NFC real person document authentication, thereby successfully completing a KYC procedure. This method effectively prevents a risk of imposture caused by the injection attack of generative AI, and ensures accuracy and security of identity authentication. In an assisted authentication process, identity information such as an identity card name of a person to be authenticated is stored in a backend server and is represented by using a token, and only the token is transmitted to an assisted authentication party. The assisted authentication party cannot directly obtain specific identity information of the person to be authenticated, thereby effectively protecting privacy of the person to be authenticated. Even if the token is leaked in the authentication or transmission process, user information is not leaked, thereby ensuring information security.

In some embodiments, obtaining user identity information input by a target user includes: determining whether the first user equipment supports NFC; and if the first user equipment does not support NFC, obtaining the user identity information input by the target user. In some embodiments, it is determined, by collecting capability information of the first user equipment, whether the first user equipment supports an NFC function. If the first user equipment does not support the NFC function, the user identity information input by the target user is obtained. If the first user equipment supports the NFC function, an NFC page may be directly pulled up on the first user equipment, and at least one authentic document (that is, the target document) that is possessed by the target user and that is provided by the user, that is, the NFC-assisted authentication user, corresponding to the second user equipment is read by using an NFC module in the first user equipment, to obtain corresponding NFC information (that is, information read by the NFC module for the authentic target document). Then, information comparison is performed based on the user identity information input by the target user and the NFC information, and an authentication result corresponding to the target document is determined based on a comparison result. The authentication result indicates whether NFC authentication performed on the target document (that is, verify whether the target document is an authentic document of the target user) is successful. The NFC-assisted authentication user and the target user may be a same user, or may be two different users.

In some embodiments, the method further includes: sending, in response to a sending trigger operation performed by the target user for the authentication token information, the authentication token information to the second user equipment. In some embodiments, the first user equipment may send, in response to the sending trigger operation performed by the target user for the authentication token information, the authentication token information to the second user equipment. For example, the target user may send the authentication token information to the NFC-assisted authentication user in a social networking application, so that the first user equipment sends the authentication token information to NFC authentication user equipment, that is, the second user equipment, corresponding to the NFC-assisted authentication user.

In some embodiments, the method further includes: generating and presenting graphic code information corresponding to the authentication token information, so that the second user equipment obtains the authentication token information by scanning the graphic code information. In some embodiments, the graphic code information corresponding to the authentication token information may be generated first, and then the graphic code information is presented to the target user on the first user equipment. The graphic code information includes, but is not limited to, a QR code, a bar code, and the like. This is not limited in this specification. In some embodiments, the target user may send the graphic code information to the second user equipment by using the first user equipment. For example, the target user sends the graphic code information to the NFC-assisted authentication user in a social networking application, so that the first user equipment sends the graphic code information to NFC authentication user equipment, that is, the second user equipment, corresponding to the NFC-assisted authentication user. In some embodiments, the second user equipment may obtain the authentication token information based on a scanning operation, performed by the NFC-assisted authentication user by using a camera on the second user equipment, on the graphic code information presented on the first user equipment. In some embodiments, the second user equipment may alternatively obtain the authentication token information based on a scanning operation, performed by the NFC-assisted authentication user by using a camera on the second user equipment, on graphic code information sent by the first user equipment to the second user equipment.

Figure 2:
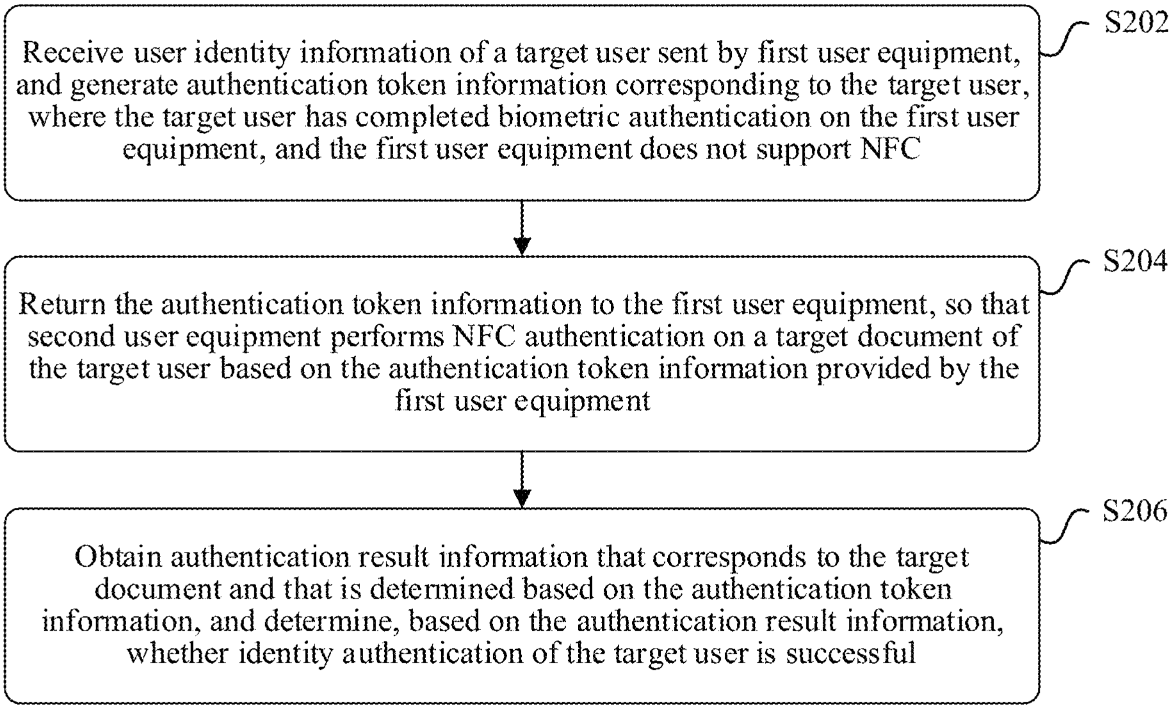
FIG. 2 is a schematic flowchart of a method for identity authentication according to an embodiment of this specification.

FIG. 2 is a schematic flowchart of a method for identity authentication that is applied to a first network device according to an embodiment of this specification. In this embodiment of this specification, the method for identity authentication is applied to a second apparatus for identity authentication or an electronic device configured with the second apparatus. The following describes the procedure shown in FIG. 2 in detail. The method for identity authentication may specifically include the following steps.

S202: Receive user identity information of a target user sent by first user equipment, and generate authentication token information corresponding to the target user, where the target user has completed biometric authentication on the first user equipment, and the first user equipment does not support NFC.

In some embodiments, the target user has completed biometric authentication on the first user equipment that does not support NFC, and the first user equipment sends the user identity information input by the target user to a first network device. The user identity information includes, but is not limited to, a user name, a document number of at least one authentic document possessed by the user, and the like. Specific content of the user identity information is not limited in this specification.

In some embodiments, the first network device receives the user identity information of the target user sent by the first user equipment, and generates the authentication token information corresponding to the target user. A specific generation manner is described in detail above, and details are not described herein again.

S204: Return the authentication token information to the first user equipment, so that second user equipment performs NFC authentication on a target document of the target user based on the authentication token information provided by the first user equipment.

In some embodiments, the first network device returns the authentication token information to the first user equipment. After receiving the authentication token information, the first user equipment may provide the authentication token information to the second user equipment (that is, NFC authentication user equipment) that supports NFC. The second user equipment performs, based on the authentication token information, NFC authentication on at least one authentic document (that is, the target document) possessed by the target user. A specific authentication manner is described in detail above, and details are not described herein again.

S206: Obtain authentication result information that corresponds to the target document and that is determined based on the authentication token information, and determine, based on the authentication result information, whether identity authentication of the target user is successful.

In some embodiments, in response to a case in which the target user continues the identity authentication procedure, the first user may send the authentication result query request corresponding to the authentication token information to the first network device. The authentication result query request is used for querying an authentication result corresponding to a target document of the target user associated with the authentication token information, that is, querying, based on the authentication token information, whether NFC authentication performed on the target document is successful. The authentication result query request includes the authentication token information.

In some embodiments, after receiving the authentication result query request, the first network device may obtain an authentication result corresponding to the target document that is obtained based on the authentication token information, determines, based on the authentication result, whether identity authentication of the target user is successful, and if the authentication result of NFC authentication performed on the target document is that the authentication is successful, determines that identity authentication of the target user is successful, or if the authentication result of NFC authentication performed on the target document is that the authentication fails, determines that identity authentication of the target user fails. The first network device may locally query, based on the authentication token information, for an authentication result corresponding to a target document of the target user associated with the authentication token information. Alternatively, the first network device may send the authentication result query request to the second network device, and the second network device locally queries, based on the authentication token information, for an authentication result corresponding to a target document of the target user associated with the authentication token information, and returns the authentication result to the first network device. In this case, the first network device and the second network device are two different network devices. The second network device (that is, an NFC authentication network device) is a network device corresponding to user equipment, that is, second user equipment (that is, NFC authentication user equipment) that supports NFC other than the first user equipment. A user (that is, an NFC-assisted authentication user) corresponding to the second user equipment may also be the target user, or the user (that is, the NFC-assisted authentication user) corresponding to the second user equipment is a user other than the target user. In some embodiments, the first network device may return indication information indicating whether identity authentication of the target user is successful to the first user equipment, so that the indication information is presented to the target user on the first user equipment. Through the foregoing steps, NFC authentication on an authentic document is completed on a device that does not support NFC through cooperation of a device that supports NFC, thereby ensuring security and integrity of identity authentication.

Figure 3:
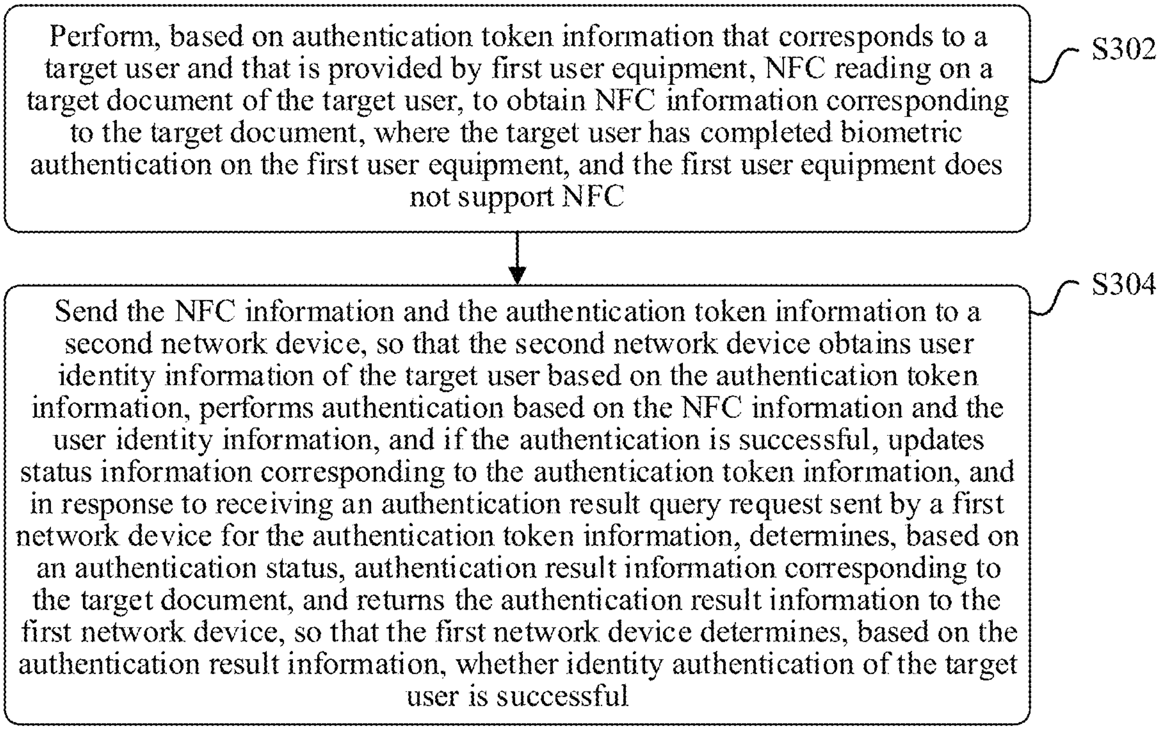
FIG. 3 is a schematic flowchart of a method for identity authentication according to an embodiment of this specification.

FIG. 3 is a schematic flowchart of a method for identity authentication that is applied to second user equipment according to an embodiment of this specification. In this embodiment of this specification, the method for identity authentication is applied to a third apparatus for identity authentication or an electronic device configured with the third apparatus. The following describes the procedure shown in FIG. 3 in detail. The method for identity authentication may specifically include the following steps.

S302: Perform, based on authentication token information that corresponds to a target user and that is provided by first user equipment, NFC reading on a target document of the target user, to obtain NFC information corresponding to the target document, where the target user has completed biometric authentication on the first user equipment, and the first user equipment does not support NFC.

In some embodiments, the target user has completed biometric authentication on the first user equipment that does not support NFC. After receiving the authentication token information returned by the first network device, the first user equipment may provide the authentication token information to second user equipment (that is, NFC authentication user equipment) that supports NFC. The second user equipment performs, based on the authentication token information, NFC reading on at least one authentic document (that is, the target document) possessed by the target user, to obtain NFC information corresponding to the target document. A specific manner of providing the authentication token information is described in detail above, and details are not described herein again.

In some embodiments, after obtaining the authentication token information provided by the first user equipment, the second user equipment may actively pull up a corresponding NFC page, to request a user, that is, an NFC-assisted authentication user, corresponding to the second user equipment to perform an assisted authentication operation on at least one authentic document (that is, the target document) possessed by the target user; or in response to an assisted authentication request initiated by the NFC-assisted authentication user for the target document, pull up the corresponding NFC page, to perform the assisted authentication operation on the target document.

In some embodiments, at least one authentic document (that is, the target document) that is possessed by the target user and that is provided by the user, that is, the NFC-assisted authentication user, corresponding to the second user equipment is read by using an NFC module in the second user equipment, to obtain NFC information (that is, information read by the NFC module for the authentic target document) corresponding to the target document. The NFC-assisted authentication user and the target user may be a same user, or may be two different users.

In some embodiments, a document type of a target document on which the target user needs to perform assisted authentication is specified by the first user equipment or the first network device for the target user, or the document type of the target document is selected by the target user on the first user equipment. In some embodiments, the second user equipment may send a corresponding document type obtaining request of assisted authentication to the first network device. The document type obtaining request of assisted authentication includes authentication token information. The first network device returns the document type of the target document to the second user equipment based on the received authentication token information. In some embodiments, when sending the authentication token information to the second user equipment, the first user equipment may send the document type of the target document to the second user equipment. In some embodiments, the first user equipment may generate corresponding graphic code information based on the authentication token information and the document type of the target document, and the second user equipment may obtain the document type of the target document based on the graphic code information provided by the first user equipment.

In some embodiments, a plurality of different types of authentic documents may be presented to the target user on the first user equipment, and the target user needs to select one of the plurality of documents as the target document for authentication. In some embodiments, alternatively, the first user equipment or the first network device may specify a default type of authentic document for the target user as the target document for authentication. In some embodiments, alternatively, the first user equipment or the first network device may determine, in the plurality of different types of authentic documents based on personal user information or a user portrait of the target user, an authentic document of a type matching the target user as the target document for authentication. In some embodiments, alternatively, the first user equipment or the first network device may determine, in the plurality of different types of authentic documents based on a completion status of the target user for biometric authentication, an authentic document of a type matching the completion status as the target document for authentication. The completion status includes, but is not limited to, authentication duration, a quantity of authentication retries, and the like of the target user in a biometric authentication process. This is not limited in this specification.

S304: Send the NFC information and the authentication token information to a second network device, so that the second network device obtains user identity information of the target user based on the authentication token information, performs authentication based on the NFC information and the user identity information, and if the authentication is successful, updates status information corresponding to the authentication token information, and in response to receiving an authentication result query request sent by a first network device for the authentication token information, determines, based on an authentication status, authentication result information corresponding to the target document, and returns the authentication result information to the first network device, so that the first network device determines, based on the authentication result information, whether identity authentication of the target user is successful.

In some embodiments, the second user equipment may send the NFC information and the authentication token information to the second network device, where the second network device (that is, an NFC authentication network device) is a network device corresponding to user equipment, that is, second user equipment (that is, NFC authentication user equipment) that supports NFC other than the first user equipment. A user (that is, an NFC-assisted authentication user) corresponding to the second user equipment may also be the target user, or the user (that is, the NFC-assisted authentication user) corresponding to the second user equipment is a user other than the target user. In some embodiments, the first network device and the second network device may be a same network device, or may be two different network devices.

In some embodiments, the second network device obtains, based on the received authentication token information, the user identity information (that is, the user identity information input by the target user on the first user equipment) of the target user associated with the authentication token information, then performs information comparison based on the user identity information and the NFC information, to determine, based on a comparison result, an authentication result corresponding to the target document. The authentication result indicates whether NFC authentication performed on the target document (that is, verify whether the target document is an authentic document of the target user) is successful.

In some embodiments, if the authentication is successful, the second network device locally updates the status information corresponding to the authentication token information, that is, updates the status information corresponding to the authentication token information to that the authentication is successful. Subsequently, after receiving the authentication result query request (the authentication result query request includes the authentication token information) sent by the first network device for the authentication token information, the second network device verifies the status information corresponding to the authentication token information, confirms the authentication result corresponding to the target document, and returns the authentication result to the first network device, so that the first network device determines, based on the authentication result, whether identity authentication of the target user is successful. If the authentication result of NFC authentication on the target document is that the authentication is successful, it is determined that identity authentication of the target user is successful. If the authentication result of NFC authentication on the target document is that the authentication fails, it is determined that identity authentication of the target user fails (that is, authentication on the authentic document fails).

In some embodiments, the method further includes: receiving the authentication token information sent by the first user equipment. In some embodiments, the first user equipment may send, in response to the sending trigger operation performed by the target user for the authentication token information, the authentication token information to the second user equipment. For example, the target user may send the authentication token information to the NFC-assisted authentication user in a social networking application, so that the first user equipment sends the authentication token information to NFC authentication user equipment, that is, the second user equipment, corresponding to the NFC-assisted authentication user. In some embodiments, the NFC-assisted authentication user may alternatively manually input the authentication token information on the second user equipment.

In some embodiments, the method further includes: obtaining the authentication token information in response to a scanning operation performed on graphic code information corresponding to the authentication token information, where the graphic code information is generated on the first user equipment. In some embodiments, the first user equipment generates the graphic code information corresponding to the authentication token information, and presents the graphic code information to the target user. The graphic code information includes, but is not limited to, a QR code, a bar code, and the like. This is not limited in this specification. In some embodiments, the target user may send the graphic code information to the second user equipment by using the first user equipment, and the second user equipment may obtain the authentication token information based on a scanning operation, performed by the NFC-assisted authentication user by using a camera on the second user equipment, on the graphic code information received by the second user equipment. For example, the target user sends the graphic code information to the NFC-assisted authentication user in a social networking application, so that the first user equipment sends the graphic code information to the NFC authentication user equipment, that is, the second user equipment, corresponding to the NFC-assisted authentication user. In some embodiments, the second user equipment may obtain the authentication token information based on a scanning operation, performed by the NFC-assisted authentication user by using a camera on the second user equipment, on the graphic code information presented on the first user equipment.

Figure 4:
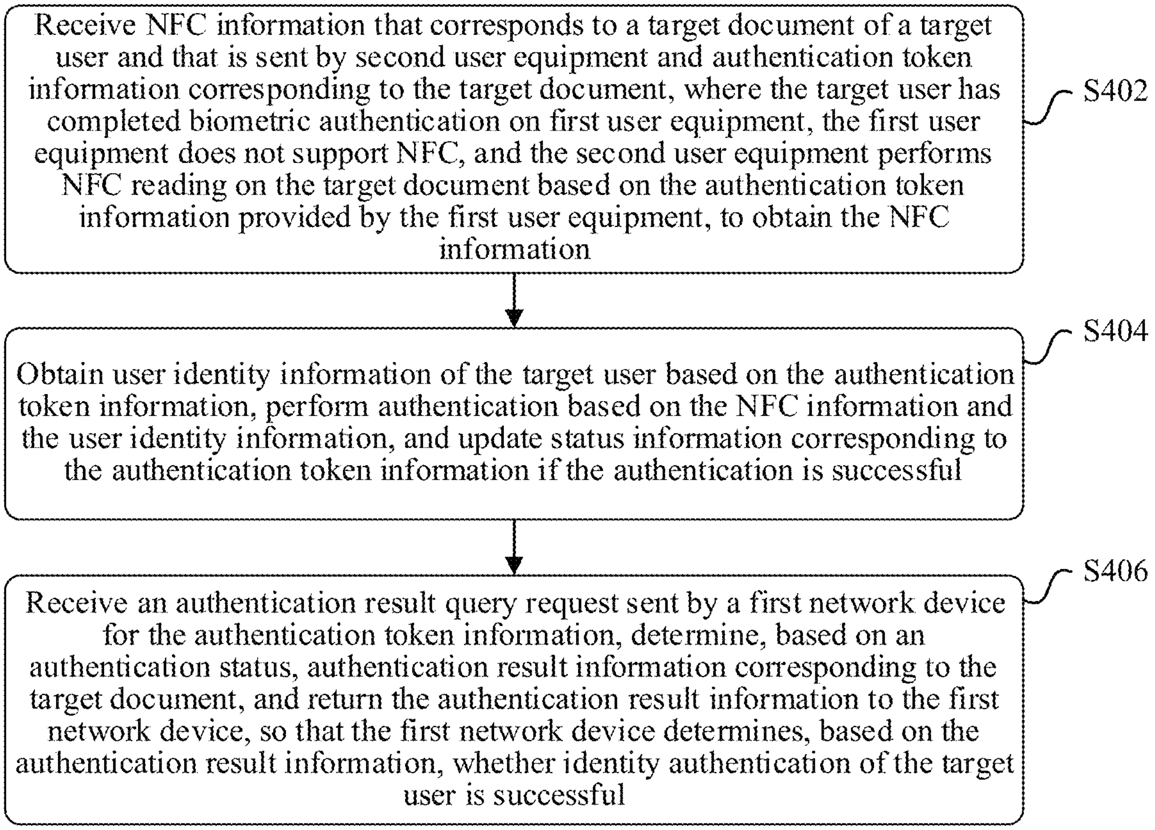
FIG. 4 is a schematic flowchart of a method for identity authentication according to an embodiment of this specification.

FIG. 4 is a schematic flowchart of a method for identity authentication that is applied to a second network device according to an embodiment of this specification. In this embodiment of this specification, the method for identity authentication is applied to a fourth apparatus for identity authentication or an electronic device configured with the fourth apparatus. The following describes the procedure shown in FIG. 4 in detail. The method for identity authentication may specifically include the following steps.

S402: Receive NFC information that corresponds to a target document of a target user and that is sent by second user equipment and authentication token information corresponding to the target document, where the target user has completed biometric authentication on first user equipment, the first user equipment does not support NFC, and the second user equipment performs NFC reading on the target document based on the authentication token information provided by the first user equipment, to obtain the NFC information.

In some embodiments, the target user has completed biometric authentication on the first user equipment that does not support NFC. The NFC module on the second user equipment reads at least one authentic document (that is, the target document) that is possessed by the target user and that is provided by the NFC-assisted authentication user, to obtain corresponding NFC information (that is, information read by the NFC module for the authentic target document), and then the second user equipment sends the NFC information and the authentication token information to the second network device.

S404: Obtain user identity information of the target user based on the authentication token information, perform authentication based on the NFC information and the user identity information, and update status information corresponding to the authentication token information if the authentication is successful.

In some embodiments, the second network device obtains, based on the received authentication token information, the user identity information (that is, the user identity information input by the target user on the first user equipment) of the target user associated with the authentication token information, then performs information comparison based on the user identity information and the NFC information, to determine, based on a comparison result, an authentication result corresponding to the target document. The authentication result indicates whether NFC authentication performed on the target document (that is, verify whether the target document is an authentic document of the target user) is successful.

In some embodiments, if the authentication is successful, the second network device locally updates the status information corresponding to the authentication token information, that is, updates the status information corresponding to the authentication token information to that the authentication is successful.

S406: Receive an authentication result query request sent by a first network device for the authentication token information, determine, based on an authentication status, authentication result information corresponding to the target document, and return the authentication result information to the first network device, so that the first network device determines, based on the authentication result information, whether identity authentication of the target user is successful.

In some embodiments, after receiving the authentication result query request (the authentication result query request includes the authentication token information) sent by the first network device for the authentication token information, the second network device verifies the status information corresponding to the authentication token information, confirms the authentication result corresponding to the target document, and returns the authentication result to the first network device, so that the first network device determines, based on the authentication result, whether identity authentication of the target user is successful. If the authentication result of NFC authentication on the target document is that the authentication is successful, it is determined that identity authentication of the target user is successful. If the authentication result of NFC authentication on the target document is that the authentication fails, it is determined that identity authentication of the target user fails.

In some embodiments, performing authentication based on the NFC information and the user identity information includes: performing information comparison verification and signature verification based on the NFC information and the user identity information. In some embodiments, the NFC information includes document information and signature information of an authentic target document that is read by the first user equipment by using the NFC module. The document information includes, but is not limited to, any information on the target document, such as a user name, a document number, and the like. Specific content of the document information is not limited in this specification.

In some embodiments, the second network device performs information comparison verification on the user identity information input by the target user on the first user equipment and the document information of the authentic target document that is read by the second user equipment by using the NFC module, and performs signature verification on the signature information of the authentic target document that is read by the second user equipment by using the NFC module. (The document information (such as a user name, a document number, or a photograph) of the target document is stored in a chip of the authentic target document, and is attached with a digital signature. When the target document is read through NFC, validity of the signature needs to be verified by using a public key. If the signature matches, it indicates that data is complete and trusted. If signature verification fails, it indicates that the data may have been tampered with or forged, that is, signature verification needs to be performed on the signature information of the target document). Only when the information comparison verification and the signature verification are successful, it is determined that the authentication result corresponding to the target document is that NFC authentication performed on the target document is successful. If the information comparison verification fails, or the signature verification fails, it is determined that the authentication result corresponding to the target document is that NFC authentication performed on the target document fails. In some embodiments, both the information comparison verification operation and the signature verification operation are performed by the second network device. In some embodiments, the information comparison verification operation is performed by the second network device, and the signature verification operation is performed by an NFC signature verification network device (different from the NFC authentication network device, that is, the second network device). The second network device may send, to the NFC signature verification network device, signature information of the authentic target document that is read by the second user equipment by using the NFC module. The NFC signature verification network device performs signature verification on the signature information, and returns a corresponding signature verification result to the second network device. In this case, because the signature information of the target document can be obtained only by using the authentic target document, even if obtaining a control right of user equipment, an attacker cannot attack by injecting forged information. In this mechanism, a risk that the user is subject to injection attack is effectively avoided.

Figure 5A:
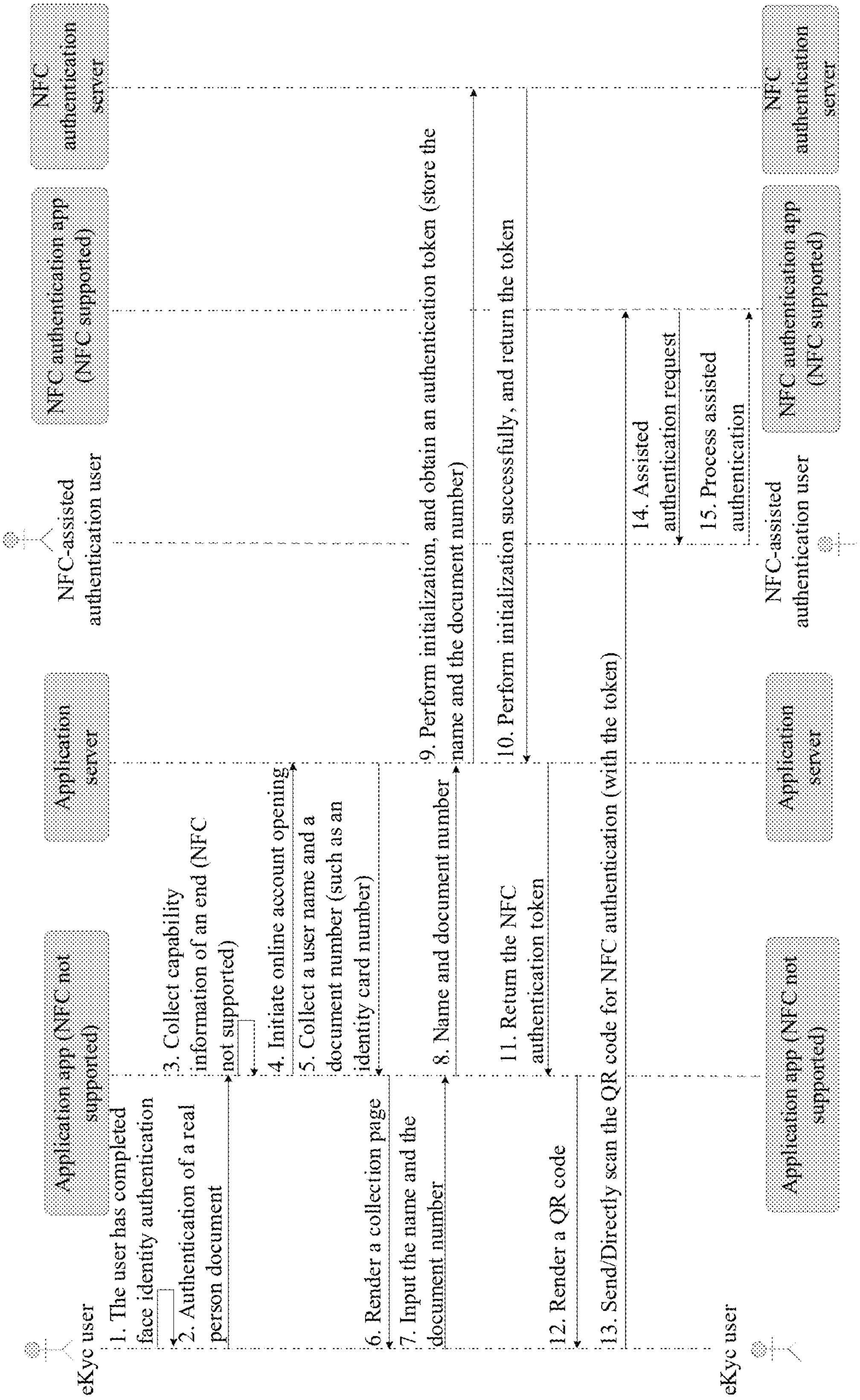
FIG. 5A-5B are schematic flowcharts of an exemplary method for identity authentication according to an embodiment of this specification.
Figure 5B:
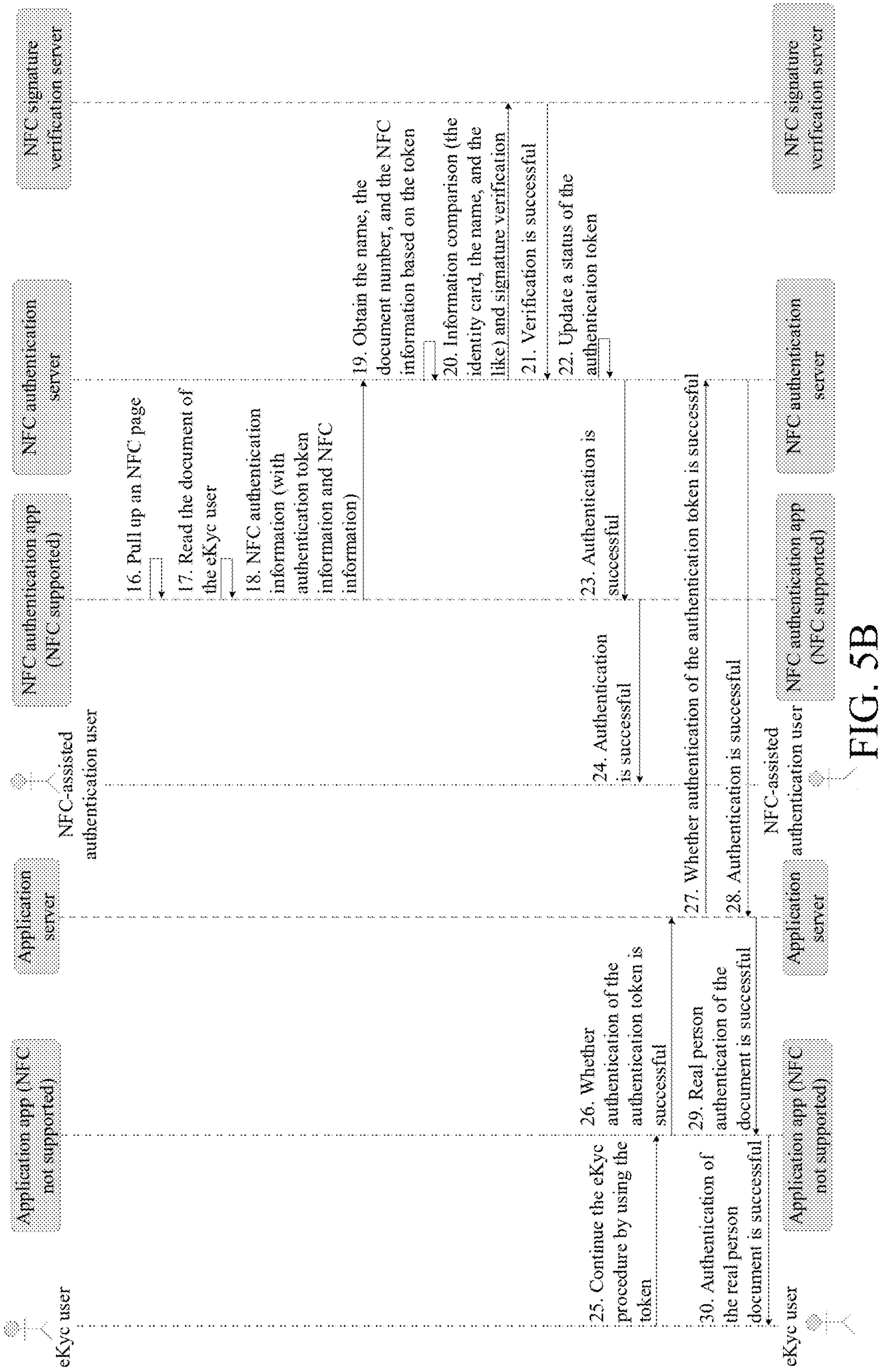

FIG. 5A-5B are schematic flowcharts of an exemplary method for identity authentication according to an embodiment of this specification.

As shown in FIG. 5A and FIG. 5B, an eKYC user (that is, a user that performs identity authentication in an electronic manner) has completed face identity authentication on an application app that does not support NFC. The eKYC user initiates authentication on a real person document (that is, an authentic document). The application app collects capability information of a device. If the device does not support NFC, the application app initiates online account opening to a corresponding application server (server). The application server collects a user name and a document (such as an identity card) number. The application app renders a collection page. The eKYC user inputs the name and the document number. The application app sends the name and the document number to the application server. The application server requests a corresponding NFC authentication server to perform initialization, obtains an authentication token (token), and stores the name and the document number. The NFC authentication server performs initialization successfully, and returns the token to the application server. The application server returns the token to the application app. The application app renders a QR code corresponding to the token. The eKYC user sends the QR code to an NFC authentication app that supports NFC. Alternatively, the NFC authentication app directly scans a QR code on the application app. The NFC authentication app initiates an assisted authentication request to an NFC-assisted authentication user. The NFC-assisted authentication user processes assisted authentication. The NFC authentication app pulls up an NFC page, reads a user document of the eKYC user, and obtains corresponding NFC information. The NFC authentication app sends the token corresponding to the QR code and the NFC information to the NFC authentication server. The NFC authentication server obtains the name and the document number based on the token, performs information comparison based on the obtained name, document number, and NFC information, and sends signature information in the NFC information to an NFC signature verification server for signature verification. If verification is successful, a token status is updated, and the NFC authentication app is notified that the authentication is successful. The NFC authentication app notifies the NFC-assisted authentication user that the authentication is successful. The eKYC user continues the eKYC procedure (that is, the identity authentication procedure) by using the token. The application app queries, from the application server, whether authentication of the token is successful. The application server queries, from the NFC authentication server, whether authentication of the token is successful. The NFC authentication server notifies the application server that the authentication is successful. The application server notifies the application app that authentication of the real person document (that is, the authentic document) is successful. The application app notifies the eKYC user that the authentication of the real person document is successful.

Figure 6:
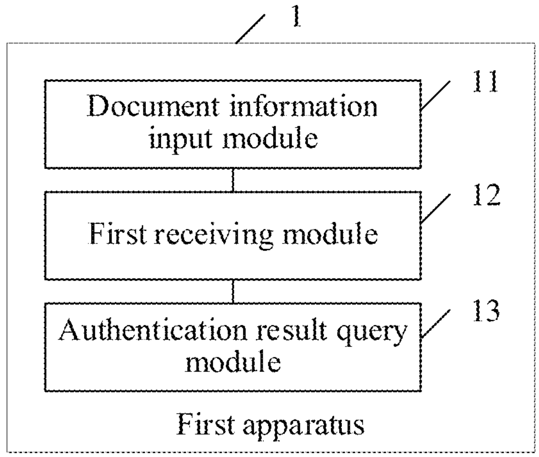
FIG. 6 is a schematic diagram of a structure of a first apparatus for identity authentication according to an embodiment of this specification.

FIG. 6 is a schematic diagram of a structure of a first apparatus for identity authentication according to an embodiment of this specification. The first apparatus for identity authentication ("first apparatus 1" for short below) may be implemented as all or a part of an electronic device through software, hardware, or a combination of software and hardware. According to some embodiments, the first apparatus 1 includes a document information input module 11, a first receiving module 12, and an authentication result query module 13.

The document information input module 11 is configured to: obtain user identity information input by a target user, and send the user identity information to a first network device, so that the first network device generates authentication token information corresponding to the target user, where the first user equipment does not support NFC, and the target user has completed biometric authentication on the first user equipment;

the first receiving module 12 is configured to receive the authentication token information returned by the first network device, so that second user equipment performs NFC authentication on a target document of the target user based on the authentication token information provided by the first user equipment; and the authentication result query module 13 is configured to send an authentication result query request corresponding to the authentication token information to the first network device, so that the first network device obtains authentication result information that corresponds to the target document and that is determined based on the authentication token information, and determines, based on the authentication result information, whether identity authentication of the target user is successful.

In some embodiments, obtaining user identity information input by a target user includes:

determining whether the first user equipment supports NFC; and if the first user equipment does not support NFC, obtaining the user identity information input by the target user.

In some embodiments, the first apparatus 1 is further configured to:

send, in response to a sending trigger operation performed by the target user for the authentication token information, the authentication token information to the second user equipment.

In some embodiments, the first apparatus 1 is further configured to:

generate and present graphic code information corresponding to the authentication token information, so that the second user equipment obtains the authentication token information by scanning the graphic code information.

Figure 7:
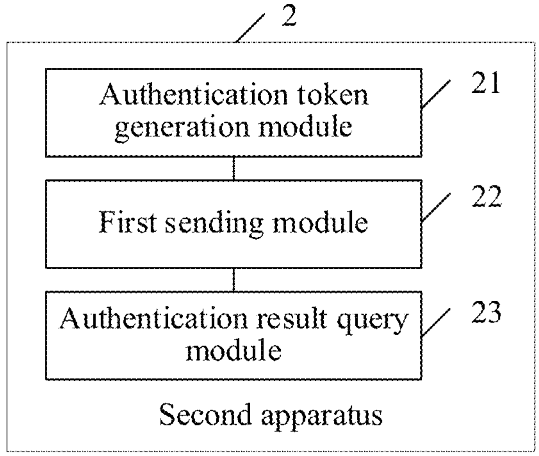
FIG. 7 is a schematic diagram of a structure of a second apparatus for identity authentication according to an embodiment of this specification.

FIG. 7 is a schematic diagram of a structure of a second apparatus for identity authentication according to an embodiment of this specification. The second apparatus for identity authentication ("second apparatus 2" for short below) may be implemented as all or a part of an electronic device through software, hardware, or a combination of software and hardware. According to some embodiments, the second apparatus 2 includes an authentication token generation module 21, a first sending module 22, and an authentication result obtaining module 23.

The authentication token generation module 21 is configured to: receive user identity information of a target user sent by first user equipment, and generate authentication token information corresponding to the target user, where the target user has completed biometric authentication on the first user equipment, and the first user equipment does not support NFC;

the first sending module 22 is configured to return the authentication token information to the first user equipment, so that second user equipment performs NFC authentication on a target document of the target user based on the authentication token information provided by the first user equipment; and the authentication result obtaining module 23 is configured to: obtain authentication result information that corresponds to the target document and that is determined based on the authentication token information, and determine, based on the authentication result information, whether identity authentication of the target user is successful.

Figure 8:
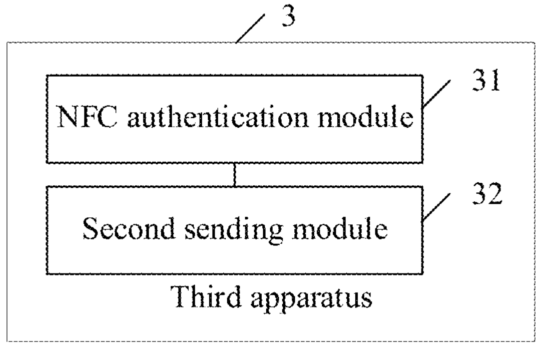
FIG. 8 is a schematic diagram of a structure of a third apparatus for identity authentication according to an embodiment of this specification.

FIG. 8 is a schematic diagram of a structure of a third apparatus for identity authentication according to an embodiment of this specification. The third apparatus for identity authentication ("third apparatus 3" for short below) may be implemented as all or a part of an electronic device through software, hardware, or a combination of software and hardware. According to some embodiments, the third apparatus 3 includes an NFC authentication module 31 and a second sending module 32.

The NFC authentication module 31 is configured to perform, based on authentication token information that corresponds to a target user and that is provided by first user equipment, NFC reading on a target document of the target user, to obtain NFC information corresponding to the target document, where the target user has completed biometric authentication on the first user equipment, and the first user equipment does not support NFC; and the second sending module 32 is configured to send the NFC information and the authentication token information to a second network device, so that the second network device obtains user identity information of the target user based on the authentication token information, performs authentication based on the NFC information and the user identity information, and if the authentication is successful, updates status information corresponding to the authentication token information, and in response to receiving an authentication result query request sent by a first network device for the authentication token information, determines, based on an authentication status, authentication result information corresponding to the target document, and returns the authentication result information to the first network device, so that the first network device determines, based on the authentication result information, whether identity authentication of the target user is successful.

In some embodiments, the third apparatus 3 is further configured to:

receive the authentication token information sent by the first user equipment.

In some embodiments, the third apparatus 3 is further configured to:

obtain the authentication token information in response to a scanning operation performed on graphic code information corresponding to the authentication token information, where the graphic code information is generated on the first user equipment.

Figure 9:
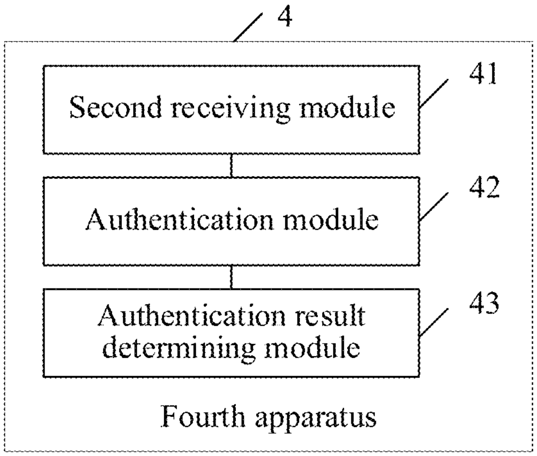
FIG. 9 is a schematic diagram of a structure of a fourth apparatus for identity authentication according to an embodiment of this specification.

FIG. 9 is a schematic diagram of a structure of a fourth apparatus for identity authentication according to an embodiment of this specification. The fourth apparatus for identity authentication ("fourth apparatus 4" for short below) may be implemented as all or a part of an electronic device through software, hardware, or a combination of software and hardware. According to some embodiments, the fourth apparatus 4 includes a second receiving module 41, an authentication module 42, and an authentication result determining module 43.

The second receiving module 41 is configured to receive NFC information that corresponds to a target document of a target user and that is sent by second user equipment and authentication token information corresponding to the target document, where the target user has completed biometric authentication on first user equipment, the first user equipment does not support NFC, and the second user equipment performs NFC reading on the target document based on the authentication token information provided by the first user equipment, to obtain the NFC information;

the authentication module 42 is configured to: obtain user identity information of the target user based on the authentication token information, perform authentication based on the NFC information and the user identity information, and update status information corresponding to the authentication token information if the authentication is successful; and the authentication result determining module 43 is configured to: receive an authentication result query request sent by a first network device for the authentication token information, determine, based on an authentication status, authentication result information corresponding to the target document, and return the authentication result information to the first network device, so that the first network device determines, based on the authentication result information, whether identity authentication of the target user is successful.

In some embodiments, performing authentication based on the NFC information and the user identity information includes:

performing information comparison verification and signature verification based on the NFC information and the user identity information.

The foregoing apparatus embodiments correspond to the method embodiments. For specific description, refer to descriptions in the method embodiments, and details are not described herein again. The apparatus embodiments are obtained based on corresponding method embodiments, and have same technical effects as the corresponding method embodiments. For specific description, refer to the corresponding method embodiments.

An embodiment of this specification further provides a computer storage medium. The computer storage medium may store a plurality of instructions, and the instructions are suitable for being loaded by a processor to perform the method in the embodiments of this specification.

An embodiment of this specification further provides a computer program product, the computer program product stores at least one instruction, and the at least one instruction is loaded by the processor to perform the method in the embodiments of this specification.

Figure 10:
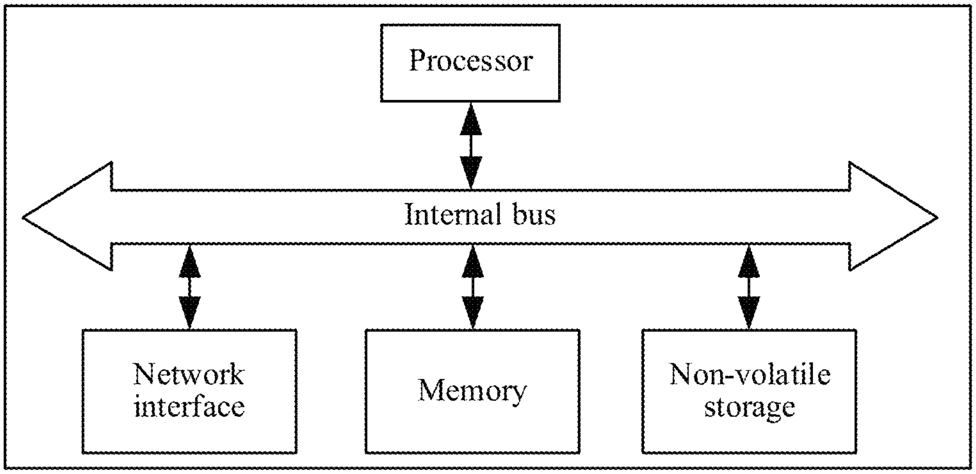
FIG. 10 is a schematic diagram of a structure of an electronic device according to an embodiment of this specification.

An embodiment of this specification further provides a schematic diagram of a structure of an electronic device shown in FIG. 10. As shown in FIG. 10, from the perspective of hardware, the electronic device includes a processor, an internal bus, a network interface, a memory, and a non-volatile storage, and certainly may further include hardware required by other services. The processor reads a corresponding computer program from the non-volatile storage into the memory and then runs the computer program, to implement the method in the embodiments of this specification.

The system, the apparatus, the module or the unit described in the foregoing embodiments may be specifically implemented by a computer chip or an entity, or implemented by a product having a function. A typical implementation device is a computer. Specifically, the computer may be, for example, a personal computer, a laptop computer, a cellular phone, a camera phone, a smartphone, a personal digital assistant, a media player, a navigation device, an email device, a game console, a tablet computer, a wearable device, or any combination of these devices.

A person skilled in the art should understand that the embodiments of this specification may be provided as a method, a system, or a computer program product. Therefore, this specification may use a form of hardware-only embodiments, software-only embodiments, or embodiments combining software and hardware. In addition, this specification may use a form of a computer program product implemented on one or more computer available storage media (including but not limited to a magnetic disk memory, a CD-ROM, an optical memory, and the like) that include computer usable program code.

This specification is described with reference to the flowcharts and/or block diagrams of the method, the device (system), and the computer program product according to the embodiments of this specification. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the computer or the processor of another programmable data processing device.

These computer program instructions may alternatively be stored in a computer-readable memory that can instruct a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may further be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

It should be further noted that the terms "include", "comprise", or any variants thereof are intended to cover a non-exclusive inclusion. Therefore, a process, method, article, or device that includes a series of elements not only includes such elements, but also includes other elements not specified expressly, or may include inherent elements of the process, method, article, or device. Unless otherwise specified, an element limited by "include a/an . . . " does not exclude other same elements existing in the process, the method, the article, or the device that includes the element.

This specification can be described in the general context of computer-executable instructions executed by a computer, for example, program modules. Generally, the program module includes a routine, a program, an object, a component, a data structure, and the like for executing a particular task or implementing a particular abstract data type. This specification may also be implemented in a distributed computing environment in which tasks are performed by remote processing devices connected by using a communication network. In a distributed computing environment, the program module may be located in both local and remote computer storage media including storage devices.

The embodiments of this specification are all described in a progressive manner, for same or similar parts in the embodiments, refer to these embodiments, and descriptions of each embodiment focus on a difference from other embodiments. Especially, a system embodiment is basically similar to a method embodiment, and therefore is described briefly. For related parts, refer to partial descriptions in the method embodiment.

The foregoing descriptions are merely embodiments of this specification, but are not intended to limit this specification. A person skilled in the art may make various modifications and variations to this specification. Any modification, equivalent replacement, or improvement made within the spirit and principle of this specification shall fall within the scope of the claims of this specification.

The invention claimed is:

1. A method for identity authentication, applied to first user equipment, and comprising:

obtaining user identity information input by a target user, and sending the user identity information to a first network device, so that the first network device generates authentication token information corresponding to the target user, wherein the first user equipment does not support NFC, and the target user has completed biometric authentication on the first user equipment;

receiving the authentication token information returned by the first network device, so that second user equipment performs NFC authentication on a target document of the target user based on the authentication token information provided by the first user equipment; and sending an authentication result query request corresponding to the authentication token information to the first network device, so that the first network device obtains authentication result information that corresponds to the target document and that is determined based on the authentication token information, and determines, based on the authentication result information, whether identity authentication of the target user is successful.

2. The method according to claim 1, wherein the obtaining user identity information input by a target user comprises:

determining whether the first user equipment supports NFC; and if the first user equipment does not support NFC, obtaining the user identity information input by the target user.

3. The method according to claim 1, further comprising:

sending, in response to a sending trigger operation performed by the target user for the authentication token information, the authentication token information to the second user equipment.

4. The method according to claim 1, further comprising:

generating and presenting graphic code information corresponding to the authentication token information, so that the second user equipment obtains the authentication token information by scanning the graphic code information.

5. An electronic device configured with a first user equipment, comprising a processor and a memory, wherein the memory stores a computer program, and when the processor executes the computer program, the electronic device is caused to:

obtain user identity information input by a target user, and send the user identity information to a first network device, so that the first network device generates authentication token information corresponding to the target user, wherein the first user equipment does not support NFC, and the target user has completed biometric authentication on the first user equipment;

receive the authentication token information returned by the first network device, so that second user equipment performs NFC authentication on a target document of the target user based on the authentication token information provided by the first user equipment; and send an authentication result query request corresponding to the authentication token information to the first network device, so that the first network device obtains authentication result information that corresponds to the target document and that is determined based on the authentication token information, and determines, based on the authentication result information, whether identity authentication of the target user is successful.

6. The electronic device according to claim 5, wherein the electronic device being caused to obtain user identity information input by a target user comprises being caused to:

determine whether the first user equipment supports NFC; and if the first user equipment does not support NFC, obtain the user identity information input by the target user.

7. The electronic device according to claim 5, is further caused to:

send, in response to a sending trigger operation performed by the target user for the authentication token information, the authentication token information to the second user equipment.

8. The electronic device according to claim 5, is further caused to:

generate and present graphic code information corresponding to the authentication token information, so that the second user equipment obtains the authentication token information by scanning the graphic code information.

9. A non-transitory storage medium, having a computer program stored thereon, wherein the computer program, when executed by a processor of a first user equipment, causes the processor to:

obtain user identity information input by a target user, and send the user identity information to a first network device, so that the first network device generates authentication token information corresponding to the target user, wherein the first user equipment does not support NFC, and the target user has completed biometric authentication on the first user equipment;

receive the authentication token information returned by the first network device, so that second user equipment performs NFC authentication on a target document of the target user based on the authentication token information provided by the first user equipment; and send an authentication result query request corresponding to the authentication token information to the first network device, so that the first network device obtains authentication result information that corresponds to the target document and that is determined based on the authentication token information, and determines, based on the authentication result information, whether identity authentication of the target user is successful.

10. The non-transitory storage medium according to claim 9, wherein the processor being caused to obtain user identity information input by a target user comprises being caused to:

determine whether the first user equipment supports NFC; and if the first user equipment does not support NFC, obtain the user identity information input by the target user.

11. The non-transitory storage medium according to claim 9, wherein the processor further comprises being caused to:

send, in response to a sending trigger operation performed by the target user for the authentication token information, the authentication token information to the second user equipment.

12. The non-transitory storage medium according to claim 9, wherein the processor further comprises being caused to:

generate and present graphic code information corresponding to the authentication token information, so that the second user equipment obtains the authentication token information by scanning the graphic code information.

* * * * *